United States Patent
Yamamoto et al.

(10) Patent No.: US 7,480,463 B2
(45) Date of Patent: Jan. 20, 2009

(54) LED DRIVE CIRCUIT

(75) Inventors: Kenji Yamamoto, Kanagawa (JP); Akihiko Satokata, Tokyo (JP)

(73) Assignee: Lite-On Technology Corp., Neihu, Taipei (TW)

( * ) Notice: Subject to any disclaimer, the term of this patent is extended or adjusted under 35 U.S.C. 154(b) by 1122 days.

(21) Appl. No.: 10/873,893

(22) Filed: Jun. 22, 2004

(65) Prior Publication Data

US 2005/0029527 A1 Feb. 10, 2005

(30) Foreign Application Priority Data

Aug. 5, 2003 (JP) ............................ 2003-287155

(51) Int. Cl.
 *H04B 10/04* (2006.01)
(52) U.S. Cl. .................. 398/182; 372/38.1; 372/29.015
(58) Field of Classification Search ................ 315/151, 315/149, 224, 291, 307; 345/82, 80, 102; 382/182, 135, 140; 372/38.1, 38.01, 38.02, 372/38.07, 29.015
 See application file for complete search history.

(56) References Cited

U.S. PATENT DOCUMENTS 5,191,589 A * 3/1993 Amano et al. ............. 372/38.02
5,349,595 A * 9/1994 Ogawa et al. ............. 372/38.02
6,031,855 A * 2/2000 Watanabe ................. 372/38.02
6,728,494 B2 * 4/2004 Numata et al. ............... 398/182
6,961,033 B2 * 11/2005 Fukumoto et al. ............. 345/82
2001/0050795 A1 12/2001 Numata et al.

FOREIGN PATENT DOCUMENTS

| EP | 0 495 576 | 7/1992 |
| EP | 0 704 948 | 4/1996 |
| EP | 0 798 828 | 10/1997 |

OTHER PUBLICATIONS

Miyachi, K. "Applied Technologies of Plastic Optical Fiber," pp. 72-73, Denkishoin, 1988.

* cited by examiner

*Primary Examiner*—Douglas W. Owens
*Assistant Examiner*—Ephrem Alemu
(74) *Attorney, Agent, or Firm*—Winston Hsu

(57) ABSTRACT

An LED drive circuit, wherein a circuit that drives light-emitting diode with a common connected cathode has a resistor connected to the anode of the light-emitting diode, an NPN-type transistor connected to the second terminal of the resistor that approximately determines the control current for the emission of light in cooperation with the resistor, an NPN-type transistor positioned in parallel with the resistor and connected to the anode of the light-emitting diode, and a current supply, a level shifter, and a switch for selectively changing the voltage between the base-emitter of the second transistor, which are placed between the base of transistor and resistor.

8 Claims, 5 Drawing Sheets

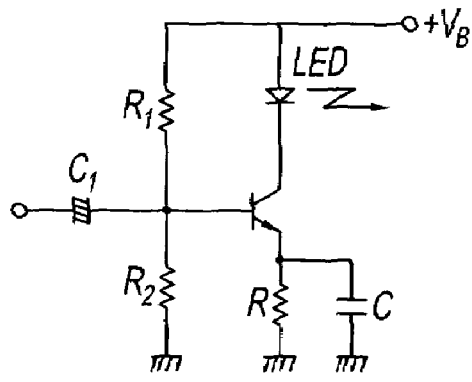
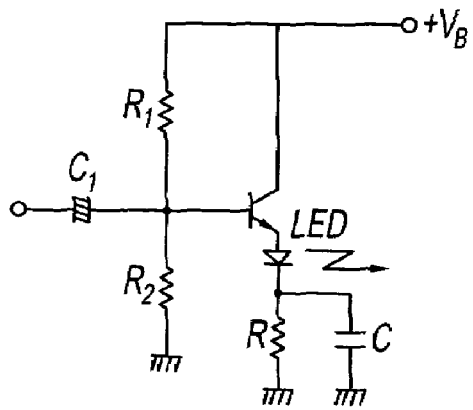
Fig. 1a
(Prior Art)
Fig. 1b
(Prior Art)
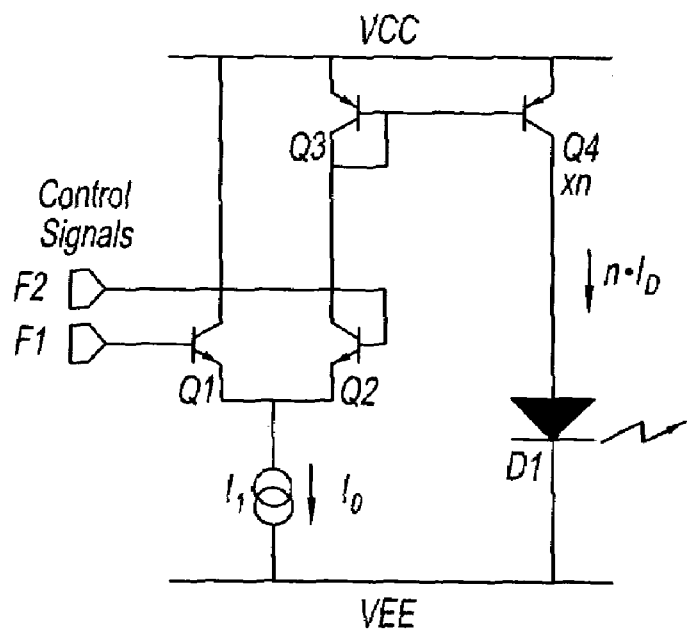
Fig. 2
(Prior Art)

LED DRIVE CIRCUIT

FIELD OF THE INVENTION

The present invention relates to a light-emitting diode (LED) constant-current drive circuit, and in particular, provides an LED drive circuit used in the application of optical communications that drives a light-emitting diode with a common cathode by current pulse.

DISCUSSION OF THE BACKGROUND ART

Light-emitting diodes are usually used as a light-emitting element in optical communications technology using optical fibers. The emitter-grounded or collector-grounded circuits in shown FIGS. 1(a) and (b) are referred to as the drive circuit for these types of LEDs. By means of these circuits, the light-emitting diode is controlled by voltage and therefore, the circuits do not have a structure with which the light emission is precisely controlled and thus, they are not appropriate for use in high-performance optical communications. That is, in high-performance optical communications control of the light emitted from a light-emitting diode should be precision current-controlled.

On the other hand, application of optical communications in recent years has also led to a demand for increased drive speed. A structure that eliminates unnecessary inductance by common connection of one side, for instance, the cathode side, of the light-emitting diode at a constant potential, such as a ground potential, is preferred in order to satisfy this demand.

An example of a circuit that has been proposed in order to control the emission of light by light-emitting diodes by controlling current with a structure wherein one side of the light-emitting diode has a common connection is shown in FIG. 2. By means of this circuit, light-emitting diode D1 is controlled on or off by differential by one pair of NPN-type transistors Q1 and Q2, the current that flows to the collector side of Q4 is controlled by a current mirror circuit that uses a pair of PNP-type transistors Q3 and Q4, and the light emitted by light-emitting diode D1 is thereby controlled. However, control using a current mirror circuit cannot be applied in high-speed switching, and the use of PNP-type transistors that operate relatively slowly makes high-speed operation of the drive circuit difficult.

Also, FIG. 3 shows an example of a drive structure that has been proposed as a structure that does not have outside control and does not use a PNP-type transistor or current mirror circuit. By means of this example, resistor R1 is connected to the anode side of a light-emitting diode whose cathode is common connected, transistor Q6 is further connected to resistor R1, and this resistor and transistor approximately determine the drive current of light-emitting diode D1. Moreover, transistor Q5 is positioned in parallel with resistor R1 with the base thereof connected between resistor R1 and transistor Q6 and the collector side thereof connected to constant-current source I3 and the base of transistor Q6. By using this type of structure, it is possible to create a pseudo-constant current from the voltage between the base emitters (VBE) of NPN-type transistor Q5 and resistance R1. However, this circuit poses a problem because there are fluctuations in the current that flows through light-emitting diode D1 with the voltage between the base emitters, it is difficult to reliably control the circuit so that a stable current can be supplied.

An example of a circuit that is a modification of the circuit in FIG. 3 is shown in FIG. 4. The intention of this circuit is to very precisely control current by placing differential amplifier U1 wherein the emitter side of transistor Q6 and the output side of constant-current source I3 serve as inputs to this amplifier. However, by means of this type of circuit, a differential amplifier is necessary, which increases circuit size and makes it difficult to guarantee stability of the entire circuit.

Therefore, the present invention provides an LED drive circuit capable of outside control with which high-speed operation of a light-emitting diode at a high frequency is possible and stable light emission by the light-emitting diode can be guaranteed.

Furthermore, the present invention provides a relatively small circuit with a simple structure with which light emission from a light-emitting diode can be precisely controlled and stable operation thereof can be guaranteed.

SUMMARY OF THE INVENTION

The present invention provides a drive circuit capable of external control to drive a light-emitting diode wherein the cathode is common connected to a ground potential. The drive circuit comprises a first resistor connected to the anode of a light-emitting diode and a first transistor connected to this resistor. The drive current for light emission by the light-emitting diode passes through the first transistor and the first resistor. The drive circuit further has a second transistor. The second transistor is connected to the anode of the light-emitting diode on the emitter side. There is a switch for controlling base voltage, that is, the voltage between the base emitters, at the base of the second transistor. The switch is connected between the first transistor and the first resistor via a level shifter. The second transistor is turned on and off by selective switching of the voltage between the base emitters by operating the switch. Emission of light by the light-emitting diode is thereby turned on and off (i.e., controlled).

By means of the drive circuit of the present invention, all of the transistors comprising the circuit are NPN-type transistors and therefore, relatively high-speed operation is possible. Moreover, the circuit of the present invention does not comprise elements that make the circuit large, such as differential amplifiers, etc., and the circuit can be easily integrated as an IC or designed as a module thereof.

Furthermore, the control circuit of the present invention provides a negative feedback effect to changes in the control current. Consequently, stable operation and high-precision control of the light-emitting diode can be achieved.

That is, the present invention provides an LED drive circuit, characterized in that a circuit that drives a light-emitting diode with a common connected cathode has a first resistor having a first terminal connected to the anode of the light-emitting diode; a first NPN-type transistor that has an emitter connected to the second terminal of the first resistor and that approximately determines the control current for emission of light in cooperation with the first resistor; a second NPN-type transistor that is positioned in parallel with the first resistor and that has an emitter connected to the anode of this light-emitting diode; and a current supply, a level shifter, and a switch with a switch for selectively changing the voltage between the base emitters of the second transistor, which are placed between the base of the second transistor and the second terminal of the first resistor.

The above-mentioned level shifter preferably comprises a third NPN-type transistor.

The switch preferably has a second resistor, one terminal of which is connected to the second transistor side and the other terminal of which is connected to the constant-current source side, and a pair of wires placed at both terminals of the second resistor element; with the switch being such that a voltage drop is or is not produced at the second resistor, depending on which wire of the pair of wires is selected as active.

The above-mentioned switch preferably has a switch comprising NPN-type transistors for activating one wire of the above-mentioned pair of wires.

Preferably, one pair of the transistors constitute the switch and they are positioned in accordance with the two terminals of the second resistor; and one pair of control input terminals control the respective transistors.

The above-mentioned cathode of the above-mentioned light-emitting diode is common connected to ground potential.

There is preferably a compensation means that produces a compensation current that compensates for the effect of the above-mentioned level shifter or the above-mentioned switch on the control current.

An idle current is preferably produced at the light-emitting diode.

By means of the drive circuit of the present invention, it is possible to produce a negative feedback circuit, without using a current mirror for the structural elements that decrease operating speed or a differential amplifier that makes the circuit larger. Furthermore, by means of the LED drive circuit of the present invention, it is possible to adjust each parameter, including the drive current, by the voltage ratio of a separate current mirror. That is, by means of the present invention, it is possible to produce a high-speed LED drive circuit that is relatively small in size, suitable for integration into an IC, and capable of external control.

BRIEF DESCRIPTION OF THE DRAWINGS

FIGS. 1a and 1b are schematic diagrams showing light-emitting diode drive circuits of the prior art;

FIG. 2 is a schematic diagram showing a light-emitting diode drive circuit of the prior art;

DETAILED DESCRIPTION OF THE PREFERRED EMBODIMENT

Figure 3:
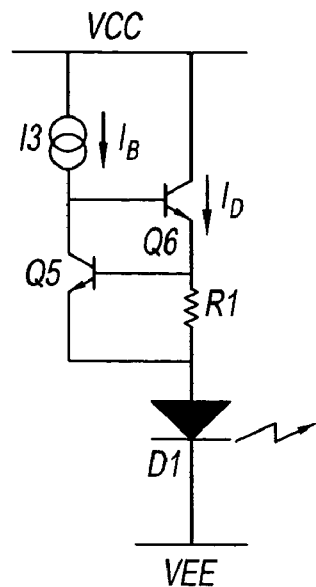
FIG. 3 is a schematic diagram showing a light-emitting diode drive circuit of the prior art.
Figure 4:
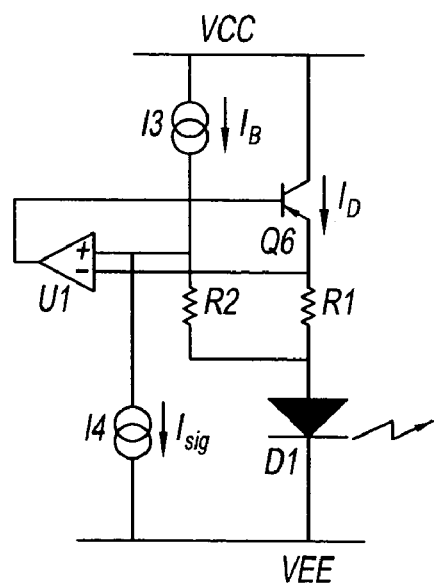
FIG. 4 is a schematic diagram showing another light-emitting diode drive circuit of the prior art.

Preferred embodiments of the present invention will now be described while referring to the drawings. A schematic diagram showing an exemplary circuit structure of the LED drive circuit of the present invention is shown in FIG. 5.

Figure 5:
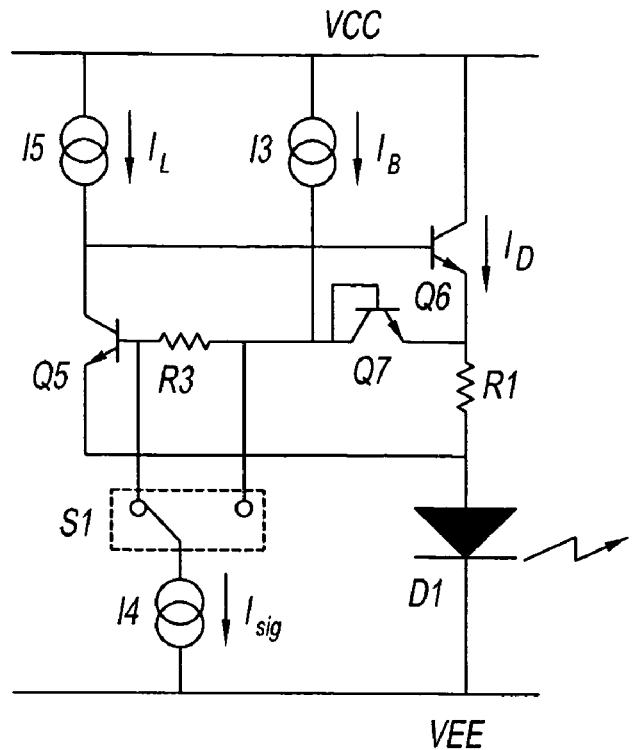
FIG. 5 is a schematic diagram showing the light-emitting diode drive circuit of a preferred embodiment of the present invention.

FIG. 5 can be compared with the circuit in FIG. 3. Attention should be focused on the fact that resistor R3 of the LED drive circuit provides a means of external control for the circuit. A pair of wires, one at each of the two terminals of R3, connect to a single-pole quadruple switch S1. Switch S1 functionality for determining whether or not control current I4 is being drawn from either of the two terminals of resistor R3 (that is, is flowing down). For instance, when the current is being drawn from the left side of resistor R3 in the figure, a voltage drop is produced by resistor R3, but if current is being drawn from the right side of resistor R3, a voltage drop is not produced. The voltage between the base emitters of transistor Q5 can be changed by the presence or absence of this voltage drop and light-emitting diode D1 can thereby be controlled on or off.

The current relating to on/off control usually flows and as a result, current flowing from constant-current source $I_B$ to the transistor Q7 side is usually constant in the present embodiment. Consequently, transistor Q7 functions as a constant level shifter and the following relationship is established between each element.

$$V_{BE7}+V_{R1}=V_{BE5}+V_{R3} \qquad (1)$$

$V_{R1}$ and $V_{R3}$ here represent the potential difference produced between the two terminals of resistors R1 and R3, respectively. Moreover, each base current here is ideally assumed to be zero. When R3/R1 is N (N>>1), the above formula (1) is re-written as follows.

$$V_{BE7}+I_D \times R1 = V_{BE5}+I_{sig} \times R3 \qquad (2)$$

When it is assumed here that $V_{BE7}=V_{BE5}$, the above formula further becomes as follows $$I_D=(R3/R1) \times I_{sig}=N \times I_{sig} \qquad (3)$$

Consequently, the current flowing to light-emitting diode D1 is approximately determined by the ratio of the magnitudes of R3 and R1. There are also cases with actual circuits where it becomes necessary to add a correction, taking into consideration the current that flows through transistor Q7, or I5, the load current of transistor Q5, and other factors.

Figure 6:
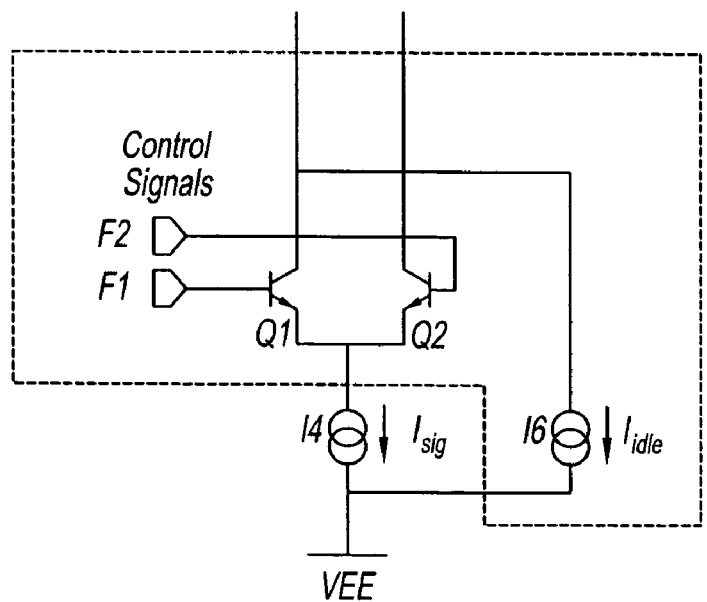
FIG. 6 is a schematic diagram illustrating the structure of the switch part of the circuit in FIG. 5.

An exemplary basic structure of switch S1 is shown in FIG. 6. Switch S1 has a pair of NPN-type transistors Q1 and Q2 and control input terminals F1 and F2 thereof corresponding to the pair of wires extending from the two terminals of resistor R3. The current that flows through constant-current source I6 acts as idle current and a bias current that is applied when light-emitting diode D1 is off. In general, this idle current is small when compared to the signal current and determines the extinction ratio when this structure is used for optical communications.

Furthermore, depending on the application, there are also cases in which idle current is not always necessary.

When switch S1 is toggled to the right here, light-emitting diode D1 is in the off mode, but in this case, formula (1) is as follows.

$$V_{BE7}=V_{R1}=V_{BE5} \qquad (4)$$

If $V_{BE7}=V_{BE5}$ here, the following is produced referring to formula (2).

$$I_D=0 \qquad (5)$$

Consequently, the current flowing to light-emitting diode D1 is understood to be approximately zero.

The relationship represented by formula (3) is established when the entire circuit is stable. If $I_{sig}$ (that is, the drive circuit flowing through light-emitting diode D1) increases for some reason, the base voltage of transistor Q5 will drop at the same instant. Consequently, the collector voltage of transistor Q5 rises and $I_D$ increases. Assuming that the impedance of light-emitting diode D1 is low enough, the increase in $I_D$ is replaced with an increase in the potential difference of resistor R1, that has the effect of raising the base potential of transistor Q5 by transistor Q7 and R3 as the level shifter.

On the other hand, when $I_{sig}$ decreases for some reason, the base voltage of transistor Q5 rises at the same instant. Consequently, the collector voltage of transistor Q5 drops and $I_D$ decreases. Assuming that the impedance of light-emitting diode D1 is low enough, the decrease in $I_D$ is replaced with an decrease in the potential difference of resistor R1 and in the end this has the effect of reducing the base potential of transistor Q5 by transistor Q7 and R3 as the level shifter.

The circuit of the present embodiment can produce a stable constant-current drive of light-emitting diode D1 while maintaining the relationship in formula (3) by applying the above-mentioned type of negative feedback. That is, by means of the present embodiment, it is possible to stabilize the drive current in an on state by using constant-current sources I3 and I4, resistor R3, and transistor Q7 as the level shifter.

By means of the present embodiment, the impedance of light-emitting diode D1 can affect the entire circuit as in-phase signals. However, the potential of the negative side of constant-current sources I3 and I5 (side where the current flows out) is usually similar, and therefore, the in-phase signal elimination ratio of the entire circuit can be relatively large. In addition, there is an advantage in that there can be an apparent increase in the output impedance of constant-current source □□ I4 as a result of using the circuit structure shown in FIG. 6 (that is, a structure wherein transistor Q2 acts as a cascade transistor of constant-current source I6, and therefore, an in-phase component will have little effect.

However, when studied in detail, the following components have an erroneous effect on the drive current of the LED.

[1] Current $I_L$ that flows to transistor Q5 and current $I_B$-$I_{sig}$ that flows to transistor Q7 are applied to the drive current of light-emitting diode D1.

[2] The base current of each of transistors Q5, Q6, and Q7 has an erroneous effect in the above-mentioned formulas.

Figure 7:
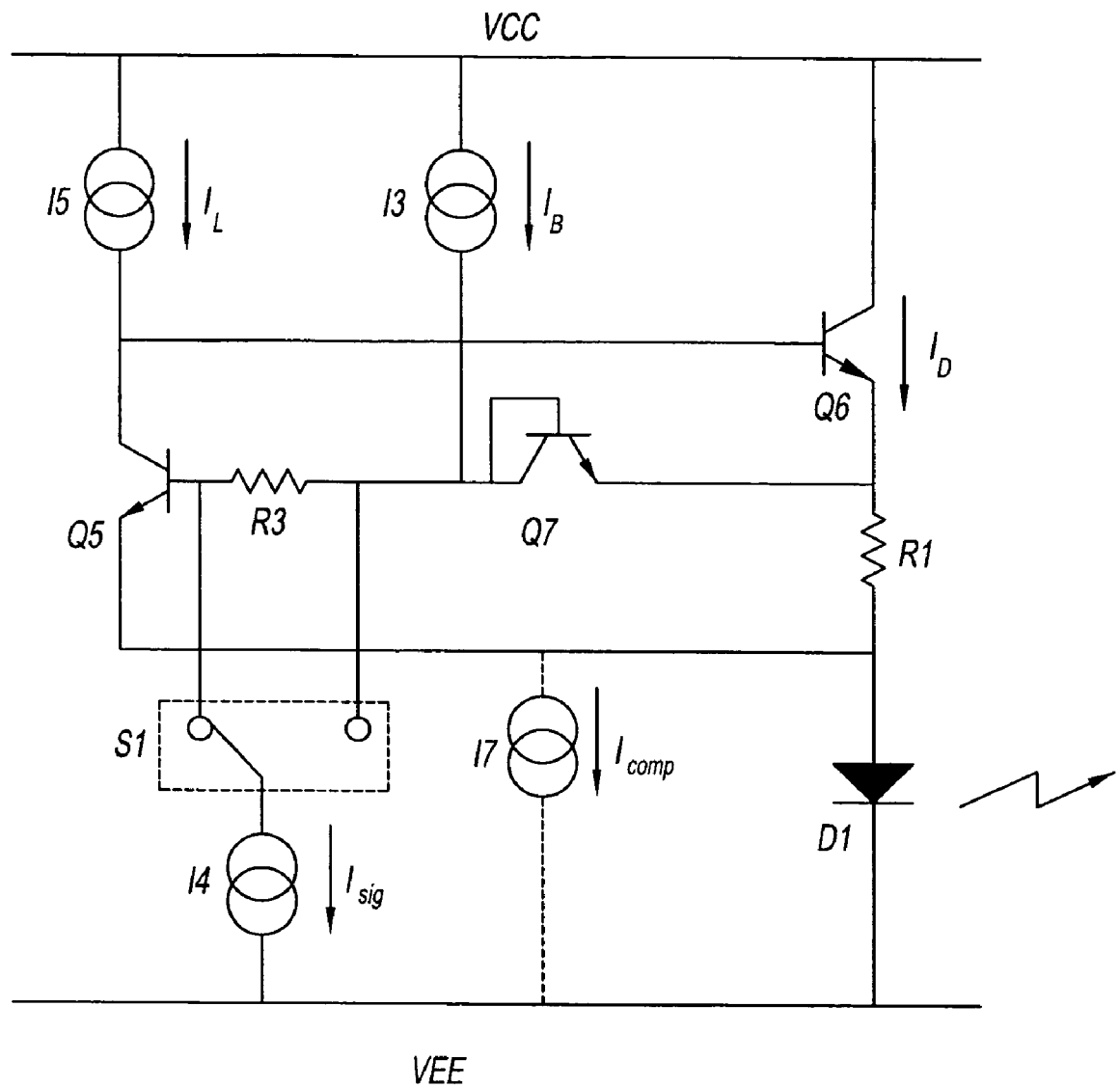
FIG. 7 is a schematic diagram illustrating the structure wherein a current source for compensation has been added to FIG. 5.

By means of the present embodiment, as to the former problem, it is possible to provide a compensation current to compensate for such errors, which is shown in FIG. 7. When the latter effect is large, a modification, such as a darlington transistor Q6, is also necessary.

A means called "peaking" is known when a high-speed drive is preferred, due to the properties of the light-emitting diode itself. This involves digitally generating a pulse where the rise and fall portions of the control pulse are short and the apparent speed of the rise and fall portions is increased by applying, during this period, a current that is larger than the normal drive current. By means of the present embodiment, this functionality can be realized with regard to the rise of signals by parallel connection of another set of switches that turn on and off (differential pair such as Q1 and Q2 and the tail constant-current sources thereof) in accordance with the short pulse for peaking.

Figure 8:
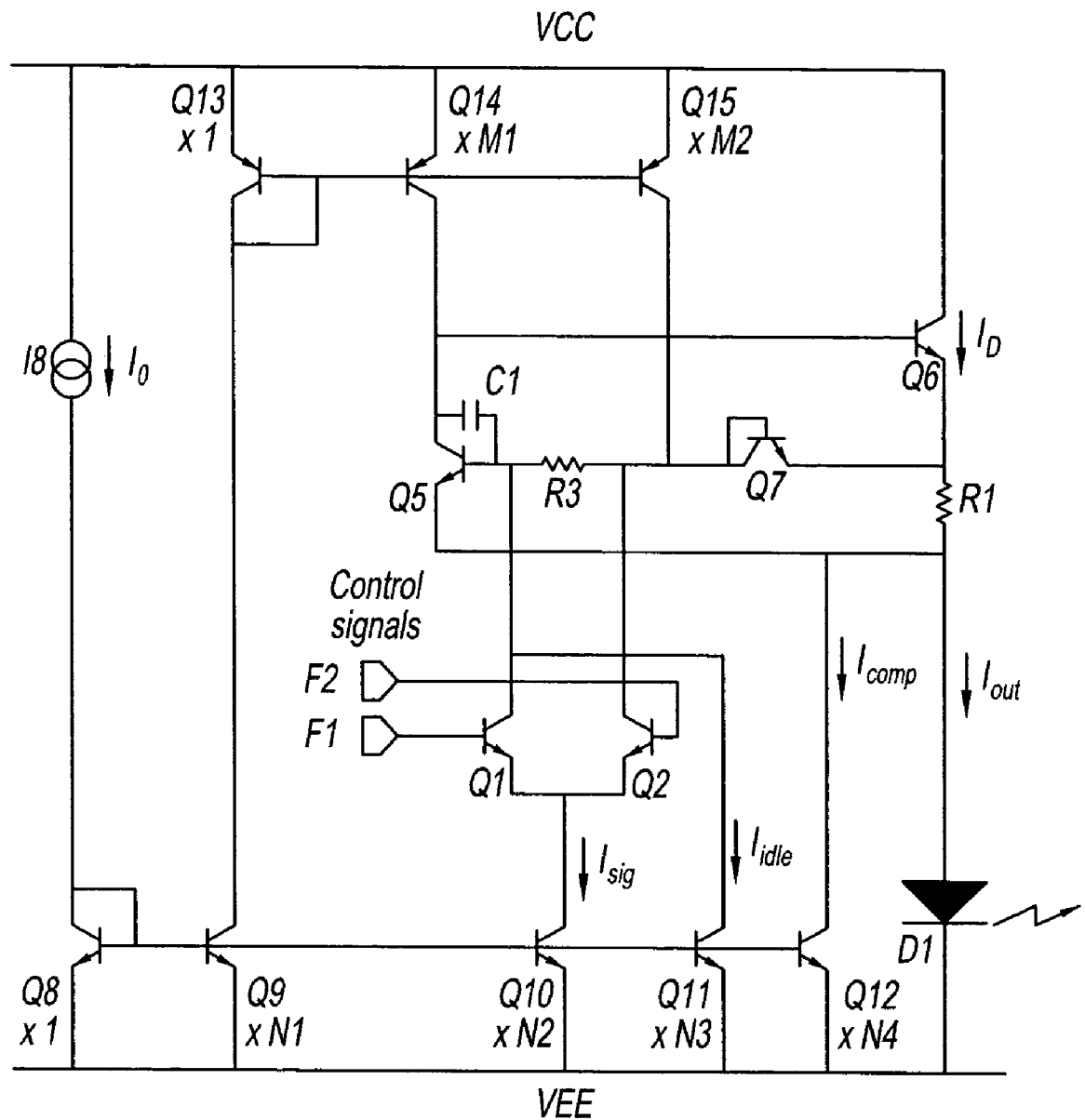
FIG. 8 is a schematic diagram showing an applied example with the drive circuit of the present invention.

FIG. 8 is a schematic diagram showing an example of a type of circuit that uses the present embodiment. The circuit of the present example is accommodated such that the LED drive circuit is basically sandwiched between two current mirrors, one an NPN-type and one a PNP-type.

The current mirrors and each transistor need not be made by bipolar technology and can be by another technology, such as CMOS, and so forth. In addition, attention should also be focused on the fact that a PNP-type transistor is placed in a position where high-speed operation is not necessary.

By means of this circuit, the constant current that becomes the origin is $I_o$ at constant-current source I8 and the emitter current ratio of each current mirror is the value shown by the respective emitter (N1 and N4, M1 and M2). Capacitor C1 inside the drive circuit is the capacity for stabilizing the negative feedback and there are also cases where it contributes to the stability of the negative feedback.

Moreover, each base current here is ideally assumed to be zero. The collector currents of transistors Q14 and Q15 are as follows.

$$I_{14}=N1 \times M1 \times I_o \qquad (6)$$

$$I_{15}=N1 \times M2 \times I_o \qquad (7)$$

Moreover, the signal current and the idle current are as follows.

$$I_{sig}=N2 \times I_o \qquad (8)$$

$$I_{idle}=N3 \times I_o \qquad (9)$$

Similarly, compensating current $I_{comp}$ is as follows.

$$I_{comp}=N4 \times I_o \qquad (10)$$

Current that flows to the light-emitting diode at this time, $I_{out}$, is as follows.

$$I_{out}=I_D+I_{14}+I_{15}-(I_{sig}+I_{idle}+I_{comp}) \qquad (11)$$

The following formula is established because the error can be brought to a minimum by making VBE of transistors Q5 and Q7 (voltage between base emitters) approximately the same here.

$$I_{15}-(I_{sig}+I_{idle})=I_{14} \qquad (12)$$

When this is applied to formula (11), the following formula is obtained.

$$I_{out}=(R3/R1) \times I_{sig}+2 \times I_{14}=I_{comp}=(R3/R1) \times I_{sig}+(2 \times N1 \times M1-N4) \times I_o \qquad (13)$$

Consequently, when the relationship $2 \times N1 \times M1=N4$ is maintained, the following relation is obtained as the ideal state.

$$I_{out}=(R3/R1) \times I_{sig} \qquad (14)$$

Of course, it is necessary to establish the correlation of $2 \times N1 \times M1=N4$ when a specific bias voltage is applied with the light-emitting diode off. In any case, this can be adjusted by the ratio of the current mirrors and therefore, optimization is relatively easy and high-precision control can be realized.

What is claimed is:

1. A light-emitting diode (LED) drive circuit including a circuit that drives a light-emitting diode with a common connected cathode, said drive circuit comprising:
   a first resistor having a first terminal connected to an anode of said light-emitting diode;
   a first NPN-type transistor that has an emitter connected to a second terminal of said first resistor and that approximately determines a control current for emission of light in cooperation with said first resistor;
   a second NPN-type transistor positioned parallel with said first resistor element that has an emitter connected to said anode of said light-emitting diode; and
   a current supply, a level shifter, and a switch for selectively changing a voltage between a base-emitter of said second NPN-type transistor, that are positioned between a base of said second NPN-type transistor and said second terminal of said first resistor.

2. The LED drive circuit according to claim 1, wherein said level shifter comprises a third NPN-type transistor.

3. The LED drive circuit according to claim 1, wherein said switch comprises a second resistor, a first terminal of which is connected to a second NPN-type transistor side of said second resistor and a second terminal of which is connected to a constant-current source side of said second resistor, and a pair of wires connectesd at said first and second terminals of said second resistor; wherein a voltage drop is or is not produced at said second resistor depending on which one of said pair of wires is selected as active.

4. The LED drive circuit according to claim 3, wherein said switch further comprises at least one additional NPN-type transistor for activating one wire of said pair of wires.

5. The LED drive circuit according to claim 4, wherein at least one pair of said additional NPN-type transistors comprise said switch and said pair of said additional NPN-type transistors are connected, respectively, to said first and second terminals of said second resistor, and one pair of control input terminals are connected to said pair of said additional NPN-type transistors for control thereof.

6. The LED drive circuit according to claim 4, wherein said cathode of said light-emitting diode is commonly connected to a ground potential.

7. The LED drive circuit according to claim 1, further comprising a compensator providing a compensation circuit for compensating for an effect of said level shifter or said switch on said control current.

8. The LED drive circuit according to claim 1, further comprising an idle current produced at said light-emitting diode.

* * * * *